US012159546B2

(12) United States Patent
Morgan

(10) Patent No.: US 12,159,546 B2
(45) Date of Patent: Dec. 3, 2024

(54) FUNCTIONALITY ENHANCEMENTS FOR E-ENABLED AIRPLANES OVER INTERNET PROTOCOL

(71) Applicant: The Boeing Company, Chicago, IL (US)

(72) Inventor: Christopher John Morgan, Seattle, WA (US)

(73) Assignee: The Boeing Company, Chicago, IL (US)

(*) Notice: Subject to any disclaimer, the term of this patent is extended or adjusted under 35 U.S.C. 154(b) by 345 days.

(21) Appl. No.: 17/542,139

(22) Filed: Dec. 3, 2021

(65) Prior Publication Data

US 2022/0189322 A1 Jun. 16, 2022

Related U.S. Application Data

(60) Provisional application No. 63/125,758, filed on Dec. 15, 2020.

(51) Int. Cl.
*G08G 5/00* (2006.01)

(52) U.S. Cl.
CPC ......... *G08G 5/0095* (2013.01); *G08G 5/0013* (2013.01); *G08G 5/0026* (2013.01)

(58) Field of Classification Search
None
See application file for complete search history.

(56) References Cited

U.S. PATENT DOCUMENTS

| | | | |
|---|---|---|---|
| 8,442,751 B2 | 5/2013 | Kimberly et al. | |
| 9,208,308 B2 | 12/2015 | McLain et al. | |
| 9,807,149 B2 | 10/2017 | Kimberly et al. | |
| 11,081,001 B1 * | 8/2021 | Pham | H04W 4/44 |
| 11,363,570 B1 * | 6/2022 | Campbell | H04N 7/185 |
| 2016/0112496 A1 | 4/2016 | Kimberly et al. | |
| 2016/0274582 A1 * | 9/2016 | Banda | G05D 1/0016 |
| 2020/0229206 A1 * | 7/2020 | Badic | H04W 28/0226 |
| 2020/0322663 A1 * | 10/2020 | Vaderna | H04L 47/263 |

* cited by examiner

*Primary Examiner* — Aniss Chad
*Assistant Examiner* — Madison R. Inserra
(74) *Attorney, Agent, or Firm* — Jordan IP Law, LLC

(57) ABSTRACT

Systems, apparatuses and methods provide for technology that establishes an internet connection with an on-ground component, and receives a first instruction from the on-ground component over the internet connection. The technology further identifies the first instruction and modifies one or more parameters of the aircraft based on the first instruction.

20 Claims, 5 Drawing Sheets

FUNCTIONALITY ENHANCEMENTS FOR E-ENABLED AIRPLANES OVER INTERNET PROTOCOL

CROSS-REFERENCE TO RELATED APPLICATION

This application is a Non-Provisional Patent Application which claims benefit to U.S. Provisional Patent Application 63/125,758 filed Dec. 15, 2020.

TECHNICAL FIELD

Examples generally relate to aircraft communications. More particularly, examples relate to internet-based communication for aircrafts.

BACKGROUND

Aircrafts communicate with each other and ground components, (e.g., base stations) through various means. For example, aircrafts use radio communications to communicate with ground components. Doing so however incurs added expenses and is prone to less efficiency. In examples, an aircraft routinely polls the base station for commands. Doing so adds inefficiency since the base station have to queue instructions until polled, resulting in instructions not being transmitted in a timely fashion depending on the frequency of the polling. Further, polling occurs regardless of whether instructions are available, resulting in inefficient power consumption and needless additional air-ground link usage costs.

Furthermore, using certain legacy systems, such as mediums, systems, and protocols (e.g., Aircraft Communications Addressing and Reporting System or ACARS), are prone to inefficiencies. For example, such protocols are designed to facilitate small payloads based on strict formatting requirements which limits the size and scope of communication. Further, costs associated with such mediums, systems and protocols can be prohibitive due to limited access and are unable to support new instruction types. Thus, legacy systems have structural, cost and integration complications.

BRIEF DESCRIPTION OF THE DRAWINGS

The various advantages of the examples will become apparent to one skilled in the art by reading the following specification and appended claims, and by referencing the following drawings, in which:

DETAILED DESCRIPTION

Figure 1:
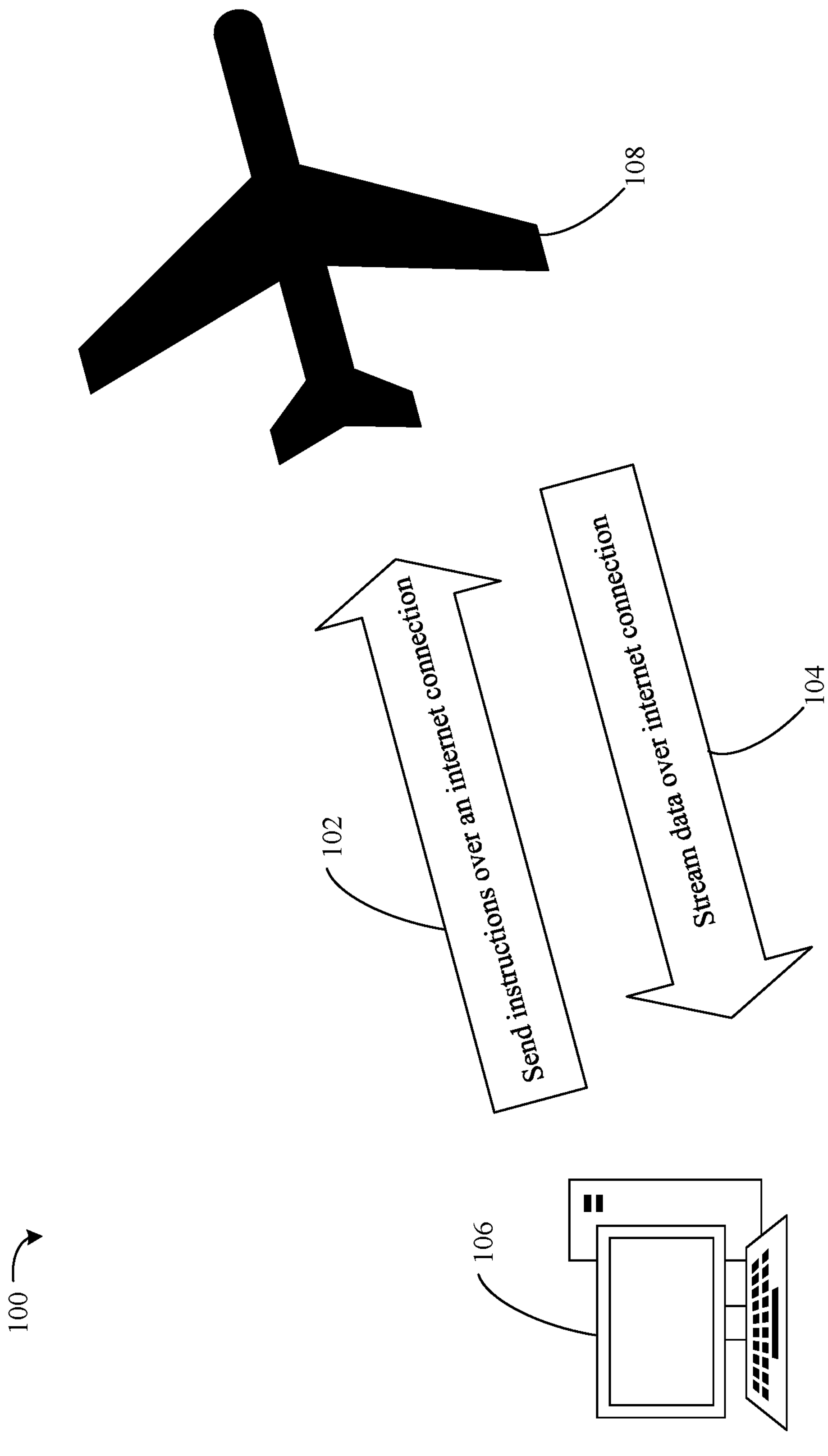
FIG. 1 is a block diagram of an example of a communication architecture according to an example.

Turning now to FIG. 1, a communication architecture 100 is illustrated. An aircraft 108 (e.g., an airplane) is connected with a base station 106. The base station 106 (e.g., a computing device) is an example of a "ground component." As illustrated, the base station 106 communicates with the aircraft 108 (e.g., an e-enabled airplane) over an internet connection. In more detail, the base station 106 sends instructions over an internet connection 102. Doing so remedies deficiencies associated with legacy systems, such as structural, cost and integration complications. For example, the internet connection is adapted and well suited to provide large amounts of data in a low-latency and continuous manner. Further, the internet connection operates at a reduced cost (relative to legacy systems) due to efficiency enhancements in the communication protocols.

Upon receiving the instructions, the aircraft 108 includes computing devices (destination systems such as sub-subsystems described in more detail below) to handle the instructions appropriately. In examples, one of the instructions includes an instruction to stream data from the aircraft 108. The data is associated with any number of sub-systems of the aircraft 108, and can be associated with location, altitude, conditions of electronic equipment, temperature, cabin pressure, occupancy, video feeds, equipment measurements, audio feeds, etc. The aircraft 108 in turn routes the instructions and/or takes action based on the instructions to retrieve the desired data. The data is streamed (e.g., in a continuous and uncrated manner to bypass zipping the data) over the internet connection 104 for a period of time.

As such, the aircraft 108 is not limited to bursts of infrequent, zipped data transmission to the base station 106. Rather, the aircraft 108 streams data as needed to the base station 106 in an efficient, cost effective manner.

It is worthwhile to note that the base station 106 provides legacy language instructions over the internet connection to the aircraft 108. The aircraft 108 then identifies such instructions and acts accordingly. Thus, examples include enhancements to the communications medium with protocol over which the instructions are sent. Other implementations transmit legacy instructions over less efficient mediums (e.g., VHF) with instructions sent in ACARS format. In contrast, examples as described herein utilize Internet Protocol (IP) over more efficient mediums (e.g., Gatelink, Terminal Cellular, satellite communications, etc.) with ACARS-like instructions encoded within Internet formats. ACARS-like instructions are still used over IP for interpretation by aircraft destination systems.

Figure 2:
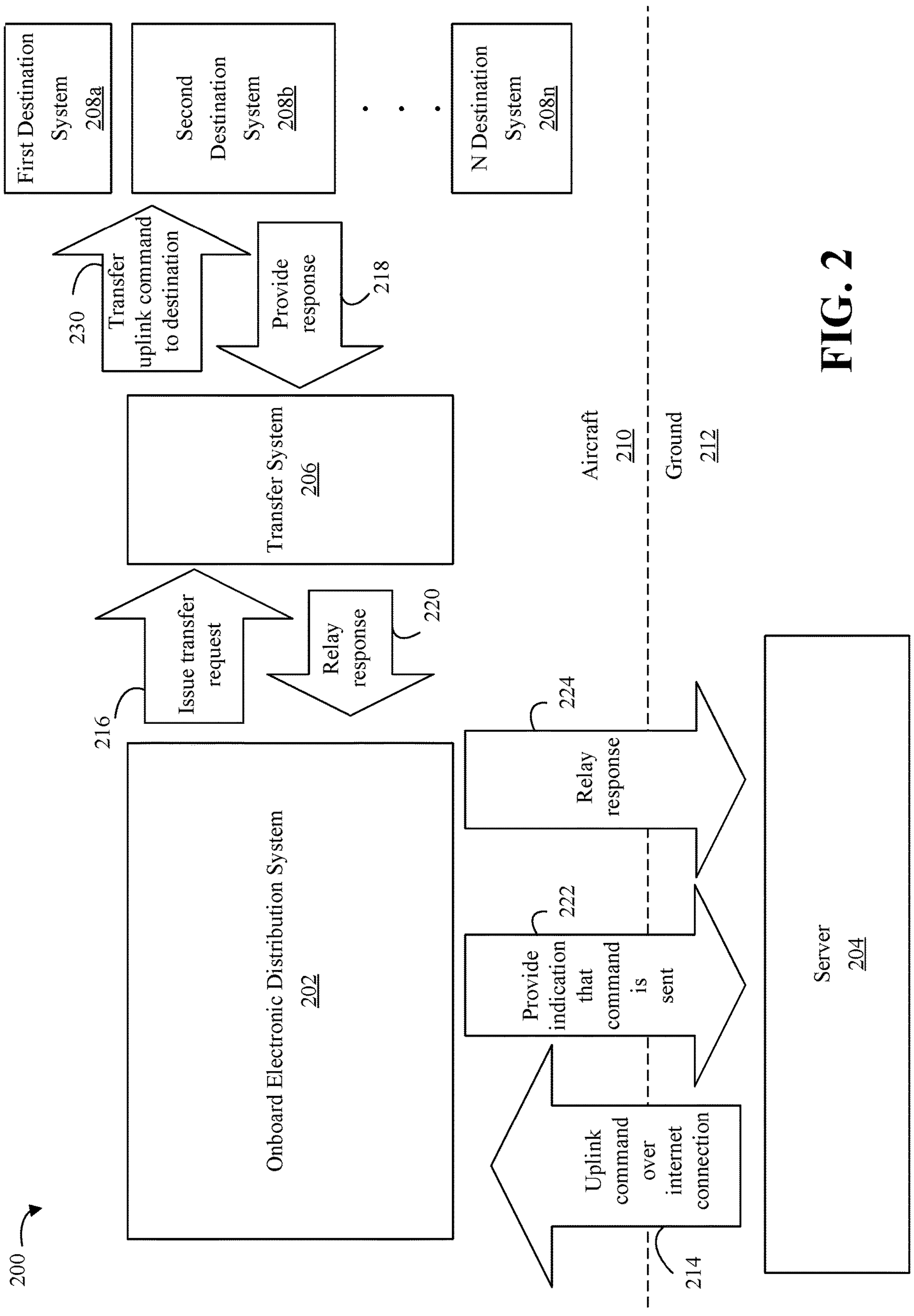
FIG. 2 is a process of an example of up linking an instruction according to an example.

Turning now to FIG. 2, a communication process 200 is illustrated that uplinks commands from a server 204 (e.g., a ground component) located on ground 212 to an onboard electronic distribution system (OEDS) 202 in an aircraft 210. In examples, all command processing is initiated by the OEDS 202 of the aircraft 210. OEDS 202 monitors the air-to-ground link status and determines whether a communications link has been established. If a link becomes available, OEDS 202 connects to server 204 (e.g., a ground data processing system) via the link (e.g., an internet connection that can be wired or wireless).

When OEDS 202 establishes a connection to the server 204, the OEDS 202 requests a list of commands queued or stored for aircraft 210. In examples, the OEDS 202 communicates with data processing systems (e.g., a proxy server computer, maintenance laptops, etc.). In examples, the OEDS 202 provides an application program interface to the ground tool to uplink commands and aircraft software parts to aircraft 210 as well as downlinking data or files.

In examples, the OEDS 202 is an aircraft client located on an aircraft 210. For example, the OEDS 202 is a software client that executes on a data processing system on the aircraft 210. In examples, OEDS 202 receives an aircraft software part for the aircraft 210 through a proxy server application associated with a library that stores the aircraft software part. After the aircraft software part has been received by the OEDS 202, the aircraft software part is installed in a line replaceable unit for use. In examples, each of the first-N destination systems 208*a*-208*n* are a line replaceable unit.

The server 204 uplinks a command (which can be referred to as an "uplink command") over an internet connection 214. A format for the uplink command is depicted in accordance with an advantageous example. In this example, the uplink command takes the form of an extensible markup language (XML) data structure. The uplink command in this example, includes a field to identify it as an uplink command.

The uplink command includes a message identifier element that provides a unique identifier for the command (e.g., to track and correlate transaction commands and responses throughout the ground to aircraft system). The uplink command also includes a type element that indicates the type of command. In this example, the type of command is identified as an uplink command. The uplink command further includes a system element that identifies the target system for the command. The uplink command further includes an application identifier element identifies the application on the target system to receive the command.

The uplink command includes a link label element that identifies the type of network link used to transfer the command from the library to the aircraft. For example, the link can be a wired link or a wireless link. The uplink command includes a server address element that identifies the address of the identified device. The uplink command further includes a data type element that provides an identification of the type of information that is subject to the command (e.g., metadata describing the type of data or file involved in a transaction). The uplink command further includes a resource type element that identifies the particular file that is subject to the command.

For example, the uplink instruction also includes identification data to identify the server 204 (e.g., an IP address for forming responses to the server 204) in the Server Address Element. Thus, the OEDS 202 identifies elements from the uplink command corresponding to the server 204 and a link (e.g., the link label) used to retrieve actions associated with the uplink command to process the uplink command. For example, these elements can be populated on the aircraft 210 by the OEDS 202 according to, respectively, the ground to air link used to retrieve/uplink a command from the ground 212 as well as the originating address of the server 204 on the ground 212. Doing so permits the OEDS 202 to provide replies and confirmations to the server 204.

As noted, the uplink command further includes the data type element of the command (e.g., a data format associated with the OEDS 202 for processing and/or forwarding). For example, the data type element indicates that the format of the instruction is an OEDS type for processing and forwarding by the OEDS 202. The uplink command also includes the actual command to be implemented (e.g., soft reset, restart, change parameter, etc.) that is identified from the resource type element. In examples, the actual command is a custom command associated with aircraft 210 to include parameter modifications specific only to the aircraft 210 and includes data values associated with the custom command. For example, the uplink command includes a single resource element that identifies and/or contains the custom command and any associated data. For example, the parameter modification can include changing an input into a program that executes on the aircraft 210, but would not change the actual program (e.g., computer code and/or logical structure) itself.

The uplink command further includes an identification of a destination system of the first-N destination systems 208*a*-208*n* to implement the actual command.

Thus, examples include OEDS 202 identifying from the uplink command that a type element is "uplink," and the OEDS 202 uses various elements from the command corresponding to the ground system and the link used to identify and retrieve the command. That is, OEDS 202 executes a custom uplink command by receiving the uplinked crated command from the server 204 and identifies the custom command from the fields described above. In a second step, OEDS 202 requests a transfer of the command by a transfer system 206 to a destination system of the first destination system 208*a*-208*n*. The purpose of the command is to provide the custom command for execution to an appropriate destination system of the first-N destination systems 208*a*-208*n* along with the data necessary (e.g., a link label and server address) to downlink a result status back to the appropriate ground system.

The internet connection is wireless and, in examples, occurs as the aircraft 210 is in-flight via satellite communications. Thus, while process 200 occurs while the aircraft 210 is in-flight, it will be understood that examples modify process 200 so that at least part of process 200 occurs as the aircraft 210 is on the ground 212 (not in-flight). In examples, the server 204 is part of a base station and/or air traffic control. For example, the OEDS 202 and/or destination system of the first destination system 208*a*-208*n* (e.g., PlaneNet systems) executes a customized command of the uplink command by receiving the uplink command and identifying the custom command in the resource element described above. In examples, the server 204 crates the uplink command prior to transmission to reduce bandwidth and enhance efficiency. For example, the server 204 includes a crate tool that receives and processes software parts, such as aircraft software instructions in a crate. The crate is a packaging system for aircraft software parts and is not necessarily a physical object. The crate, in this example, is a file that contains the uplink command, and the server 204 transmits the crated uplink command to the OEDS 202. The crate is, for example, a zip file using a zip file format, or any other compressed file format that reduces the size of the uplink command.

The OEDS 202 receives the crated uplink command. The OEDS 202 then uncrates the crated uplink command (e.g., unzip the uplink command). For example, the OEDS 202 extracts data from the uplink command to determine that the type command is 'uplink' of the uplink command. The OEDS 202 can further identifies from the uplink command the identification data from the server address element to identify the server 204 and provide replies to the server 204 based on the identification data. As such, the OEDS 202 supports routing of responses from the aircraft 210 back over the original ground to air link used to the server 204.

The OEDS 202 issues a transfer request 216 to request a transfer system (e.g., file transfer service (FTS)) 206 to transfer the uplink command to a destination 230 of the first-N destination systems 208*a*-208*n*. The OEDS 202 requests the transfer system 206 to deliver the command to the destination system defined by the uplink command, OEDS 202 uses from the uplink command, a value to denote a type of the command (e.g., that the command is to be firstly provided to the OEDS 202 for further provisioning, a data type element), a value (e.g., as part of the resource type element) denoting a specific command for execution (e.g., reset a system, power cycle, self-diagnostic, change parameter, or as otherwise listed herein, etc.) and a identification data (e.g., server address element) for forming replies to the server 204.

That is, an uplink command is sent to OEDS 202. OEDS 202 issues the transfer request 216 to transfer system 206 to send the uplink command to a line replaceable unit that is the second destination system 208*b*. In turn, transfer system 206 sends the uplink command to the second destination system 208*b*.

In this example, the transfer system 206 provides the custom command for execution to the second destination system 208*b* to process the command along with the data necessary (e.g., Link Label and Server Address, etc.) to downlink a result status back to the appropriate ground system, which is the server 204 in this example. The uplink command is not provided to other destination systems, such as the first destination system 208*a*, N destination system 208*n*, etc. The OEDS 202 further provides an indication that the command is sent 222 after the transfer system 206 transfers the uplink command to the second destination system 208*b*. That is, after the transfer of the uplink command is complete, OEDS 202 sends a downlink result status to the ground with an identification that the command is delivered (e.g., result type value of "delivered").

For example, the transfer system 206 identifies from and/or based on the uplink command that the uplink command should be routed to the second destination system 208*b*. For example, the uplink command can identify the second destination system 208*b* (e.g., as defined by the uplink command). In examples, the uplink command does not necessarily directly identify the second destination system 208*b*. The transfer system 206 routes the uplink command based on an identification that the uplink command is suitable for (able to be executed by) the second destination system 208*b*, and therefore the uplink command is compatible with the second destination system 208*b*.

An example of a custom command embedded in the uplink command includes reset of the second destination system 208*b* (e.g., soft reset/restart an application, function, system, or hard reset/power cycle a Line Replaceable Unit (LRU), etc.). Another example of a custom command embedded in the uplink command includes initiation of a test (e.g., start, continue, pause, stop, etc.) of the second destination system 208*b*. Another example of a custom command embedded in the uplink command includes initiation a data load software command (e.g., start, continue, pause, cancel, etc.) of the second destination system 208*b*.

Another example of a custom command embedded in the uplink command includes configuration aspects (e.g., select options such as configuration, algorithm, rules, etc.) of the second destination system 208*b*. Another example of a custom command embedded in the uplink command includes control aspects (e.g., functions such as start, continue, pause, stop, monitor; set constants such as count, timeout, threshold, hysteresis, priority, inhibit, key phrases; clear messages such as faults, warnings, information, history per flight leg and/or all flight legs; clear flags such as application, function; and clear memory such as by sector or all memory) of the second destination system 208*b*. Another example of a custom command embedded in the uplink command is related to maintenance (e.g., defragment memory and/or a mass Storage Device; Format a memory and/or a mass storage device) of the second destination system 208*b*.

The second destination system 208*b* provides a response 218 (e.g., sends a status result and any information requested in the uplink command) to the transfer system 206. The transfer system 206 relays the response 220. The OEDS 202 crates, signs and relays the response 224 to the server 204. If the second destination system 208*b* processes the uplink command successfully, the second destination system 208*b* sends a status of "success" along with any destination system data resulting from execution of the uplink command to the server 204. Otherwise, an error code (e.g., error message) is sent to the server 204. In examples, the resource type element for custom commands is 'command', and the OEDS 202 does not request a second uplink of a crated data file from the ground as some designs do for non-'command' types such as 'LSAP' or 'file'.

As described, the above process 200 occurs as the aircraft is in-flight. In examples, the process 200 further occurs as the aircraft is on the ground 212.

Figure 3:
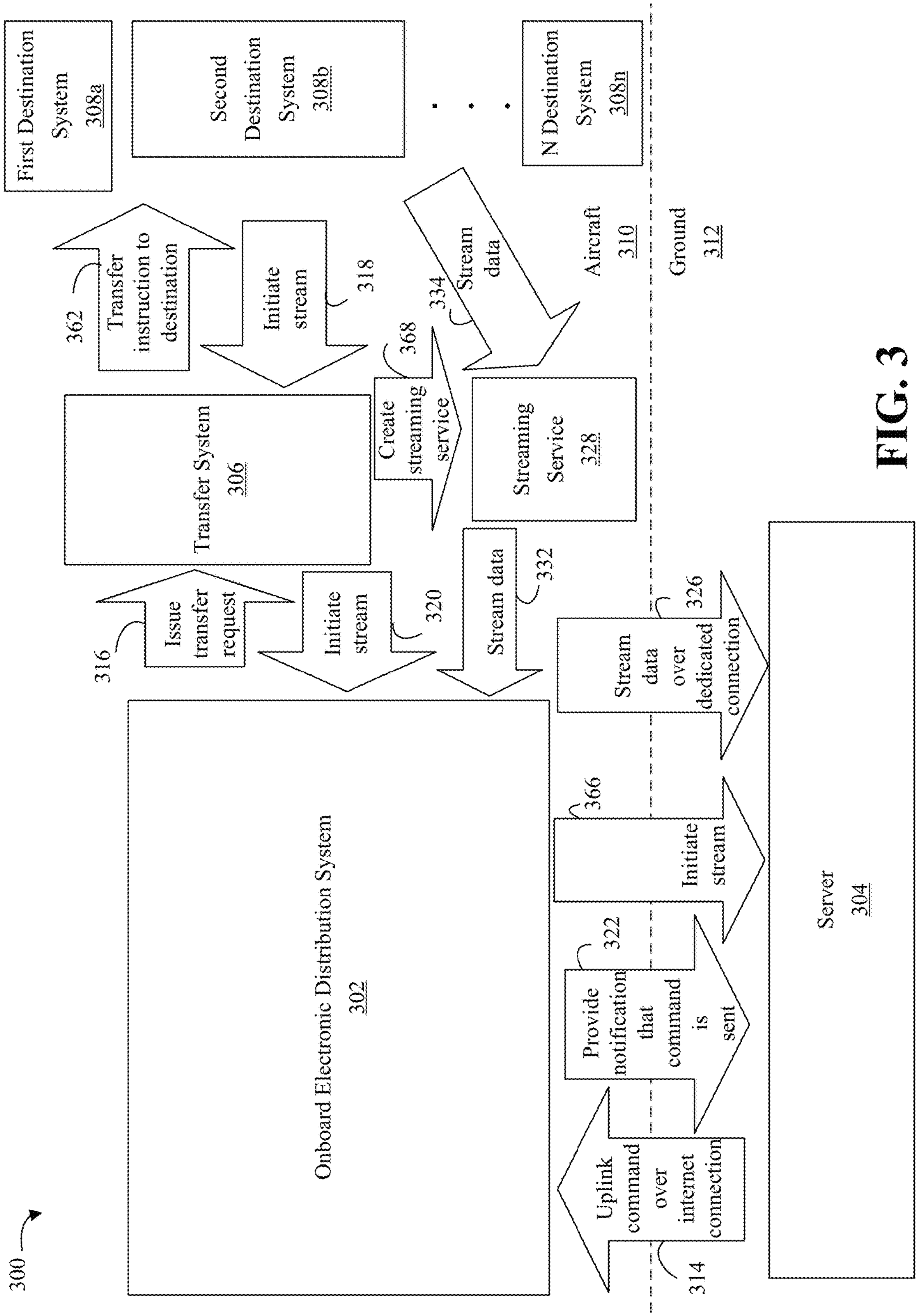
FIG. 3 is a process of an example of streaming data according to an example.

FIG. 3 illustrates a process 300 for executing downlinking commands. Downlink commands include a downlink identifier (e.g., type command of 'downlink'). Examples support at least three types of downlinks, including 1) Automatic (unsolicited) downlinks; 2) Command-initiated (solicited) downlinks; and 3) Command-initiated (solicited) streaming. Similar to above, process 300 can occur while the aircraft 310 is on the ground 312 and/or in-flight.

Process 300 relates to solicited streaming (e.g., streaming initiated in response to a remote request custom command). Such a mechanism bypasses existing FTS Server/Trivial File Transfer Protocol (TFTP) to provide direct streaming from clients to offboard links as set up by OEDS 302 and encrypted by OEDS 302, but without crating (e.g., zipping and/or compression) of the downlink stream or scheduling conflict with the existing file downlink mechanisms. Examples include a Real-time Transport Protocol (RTP) RFC3550 (e.g., a transport protocol for real-time applications) together with RTP Control Protocol (RTCP) for offboard streaming.

The OEDS 302, in addition to distributing aircraft software parts to the aircraft 310 similarly to the OEDS 202 (FIG. 2), the OEDS 302 also receives data generated by the aircraft 310. This data also is referred to as downlink data. For example, a flight recorder can generate data describing different events occurring during a flight. This data can be downlinked through OEDS 302 to a proxy server application and/or software maintenance tool back to a library, which can be part of server 304, for later use and analysis. This data also can include configuration data about the aircraft 310 software part, the line replaceable unit, or the aircraft 310 configuration.

Thus, data can flow in the other direction from aircraft 310 through a proxy server application back to a library of the server 304. This type of data is referred to as downlink data. In these examples, first-N destination systems 308*a*-308*n* (e.g., line replaceable units) can generate downlink data, which is temporarily stored in a storage device on aircraft 310. OEDS 302 sends downlink data to a proxy server application. In turn, the proxy server application sends downlink data to server 304 for storage. This data can then be processed and analyzed. This data also can include, for example, the status of software on an aircraft 310. This status information can be used to send an operator to the aircraft to initiate loading and installation of the line replaceable unit on the aircraft.

As such, a proxy server application associated with server 304 is in communication with OEDS 302 through a communications link. This communications link can take various forms. For example, a wireless communications link can be used. In this manner, aircraft parts and data can be exchanged while the aircraft 310 is on the ground or in flight.

In other examples, server 304 can be connected to OEDS 302 (e.g., an aircraft computer) through a wired link in a network. OEDS 302 processes the set of aircraft parts and stores these parts as aircraft software parts within a storage device on aircraft 310. As needed, an aircraft software part from aircraft software parts can be installed in line replaceable units. Data, such as an aircraft software part, manuals, documentation, and commands, sent to the aircraft are referred to as uplink data.

A server 304 on ground 312 uplinks a command (e.g., a downlink instruction, which will be referred to as a downlink command) over an internet connection 314 to an aircraft 310. A format for the downlink command is depicted in accordance with an advantageous example. In this example, the downlink command takes the form of an extensible markup language (XML) data structure. The downlink command, in this example, includes a field to identify it as being a downlink command.

The downlink command includes a message identifier element that provides a unique identifier for the command. The downlink command also includes a type element that indicates the type of command. In this example, the type of command is identified as a downlink command. The downlink command further includes a sub-type element (e.g., qualify commands for special cases specifying the nature of the downlink command, such as streaming. The downlink command further includes a system element that identifies the target system for the command. The downlink command further includes an application identifier element identifies the application on the target system to receive the command.

The downlink command includes a link label element that identifies the type of network link used to transfer the command from the library to the aircraft. For example, the link can be a wired link or a wireless link. The downlink command includes a server address element that identifies the address of the identified device. The downlink command further includes a data type element that provides an identification of the type of information that is subject to the command. The downlink command further includes a resource type element that identifies the particular data (e.g., data associated with initiation or beginning streaming) that is subject to the command.

The OEDS 302 identifies from the downlink command that the downlink command also includes a downlink instruction or parameter (e.g., determines that the type element is "downlink") to initiate further communication with the server 304. OEDS 302 identifies elements (e.g., message identifier element, server address element and the link label element) from the downlink command corresponding to the server 304 and the link used to retrieve the downlink command and server address of the server 304 to identify a destination to provide streamed data. The OEDS 302 identifies a value from the downlink command (e.g., sub-type element) to identify an action associated with the command (e.g., streaming), and a value for identification data (e.g., Message identifier element) to associate with the streaming service (e.g., provide the message identifier with the stream for identification by receiving parties). The OEDS 302 further identifies a destination of the first-N destination systems **308*a*-308*n*** for streaming the data. The downlink command can further include a field (e.g., as part of the resource type element) indicating that the command is to be initiated (e.g., started) as opposed to other modifications (e.g., ceased).

OEDS 302 issues a transfer request 316 to a transfer system 306 to deliver the command to a destination system 362 of the first-N destination systems **308*a*-308*n* (e.g., PlaneNet associated systems that are associated with a fiber optic local area network referred to as PlaneNet). Similar to as described above with respect to the transfer system 206 of FIG. 2, the transfer system 306 identifies based on and/or from the downlink command that the downlink command should be transferred to the second destination system 308*b*. After the transfer system 306 completes transfer[s] of the downlink command, OEDS 302 provides a notification that the command is sent 322 to the server 304** (e.g., a downlink result status to the ground with a result type value of "delivered").

The second destination system **308*b* initiates the stream 318 based on the downlink instruction. For example, the second destination system 308*b* requests that the transfer system 306 create a streaming service 368, 328 to stream the data identified in the downlink message (e.g., the resource type element) via the given offboard link using the created Streaming Service 328. The second destination system 308*b* also requests that the OEDS 302 initiate a dedicated internet connection with the server 304 for streaming. The request passes an identification parameter (e.g., the identification data and/or internet address of the server 304 provided in the downlink command) to the transfer system 306 so the transfer system 306 properly identifies and processes the request. In addition, the second destination system 308*b* uses appropriate destination and server 304 parameters from the original downlink command forwarded by the transfer system 306 in a job submission request that is sent back to the transfer system 306. The destination and parameters correspond to the link label and server address elements in the command. The transfer system 306 and OEDS 302 further initiates the stream 320, 366** based on the above (e.g., the destination and/or other parameters).

The transfer system 306 coordinates with the OEDS 302 to establish a dedicated connection for real-time streaming of data from the second destination system **308*b* to the server 304. For example, the second destination system 308*b* streams data 334. The transfer systems 306 is bypassed during the data streaming. That is, the second destination system 308*b* streams data 334 directly to the streaming service 328. The streaming service 328 streams data 332 to the OEDS 302, and the OEDS 302 streams data to the server 304 over the dedicated connection 326. The dedicated connection is a pathway from second destination system 308*b* to the server 304. The pathway includes streaming service 328 and the OEDS 302**.

If the aircraft 310 encounters an error that prevents servicing the downlink command (e.g., the streaming), the OEDS 302 attempts to downlink a result status with an appropriate result Type (e.g., error). The above process is repeated for a stop command from the server 304 requesting that streaming be stopped (e.g., server 304 requests that the streaming stop), in which case the second destination system **308*b* requests transfer system 306 to cease streaming the data identified in the downlink command (e.g., a stop command associated with the resource element of the stop command and including the fields identified above for the downlink command). The streaming service 328** is then torn down and the dedicated connection is ceased.

In examples, to enable streaming of data from the aircraft 310 over a given offboard link, a downlink command initiated from the server 304 to start streaming from a specified destination system is provided. For example, the command can include a type of the command (e.g., downlink), the command itself to stream, an internet address (e.g., IP address) of the server 304, a data type of the command, the type of data desired, and an identification of the second destination system 308*b* (e.g., the system desired to stream).

Streaming is stopped from the ground with a corresponding downlink request. The downlink request can include a type identification (e.g., downlink), identification of the streaming, an internet address (e.g., IP address) of the server 304, a data type of the command, a command to stop the streaming, and an identification of the second destination system 308*b*.

The transfer system 306 uses a job submission from the specified destination system, such as the second destination system 308*b*, to request that the OEDS 302 downlink request be handled using a streaming protocol directly from the second destination system 308*b* to the server 304. For example, examples include an instruction that indicates existing values, the new streaming values and whether to start the stream (e.g., indicated with a first value) or stop the stream (e.g., indicated with a second value). In examples, a streaming priority and port is configured in an infrastructure (e.g., an existing airplane Loadable Diagnostic Information (LDI) database).

In examples, the second destination system 308*b* streams data associated with Aircraft Communications Addressing and Reporting System (e.g., Communications Management Function (CMF)). In examples, the second destination system 308*b* streams data associated with aircraft health, such health and/or maintenance reporting (e.g., Central Maintenance Computing Function (CMCF)), continuous parameter logging (CPL, Aircraft Condition Monitoring Function (ACMF)), engine performance monitoring (Engine Monitoring Unit (EMU)). In examples, the second destination system 308*b* streams data associated with electronic security such as cyber security events (e.g., Onboard Network System (ONS)). In examples, the second destination system 308*b* streams data associated with occupant monitoring, such as onboard surveillance (e.g., audio and/or video).

As described above, the OEDS 302 executes downlink commands by first transferring the command to the second destination system 308*b*. After receiving the command, the second destination system 308*b* initiates the requested downlink. If the second destination system 308*b* encounters an error, the second destination system 308*b* attempts to downlink an error result status to the ground 312 and/or server 304.

Figure 4:
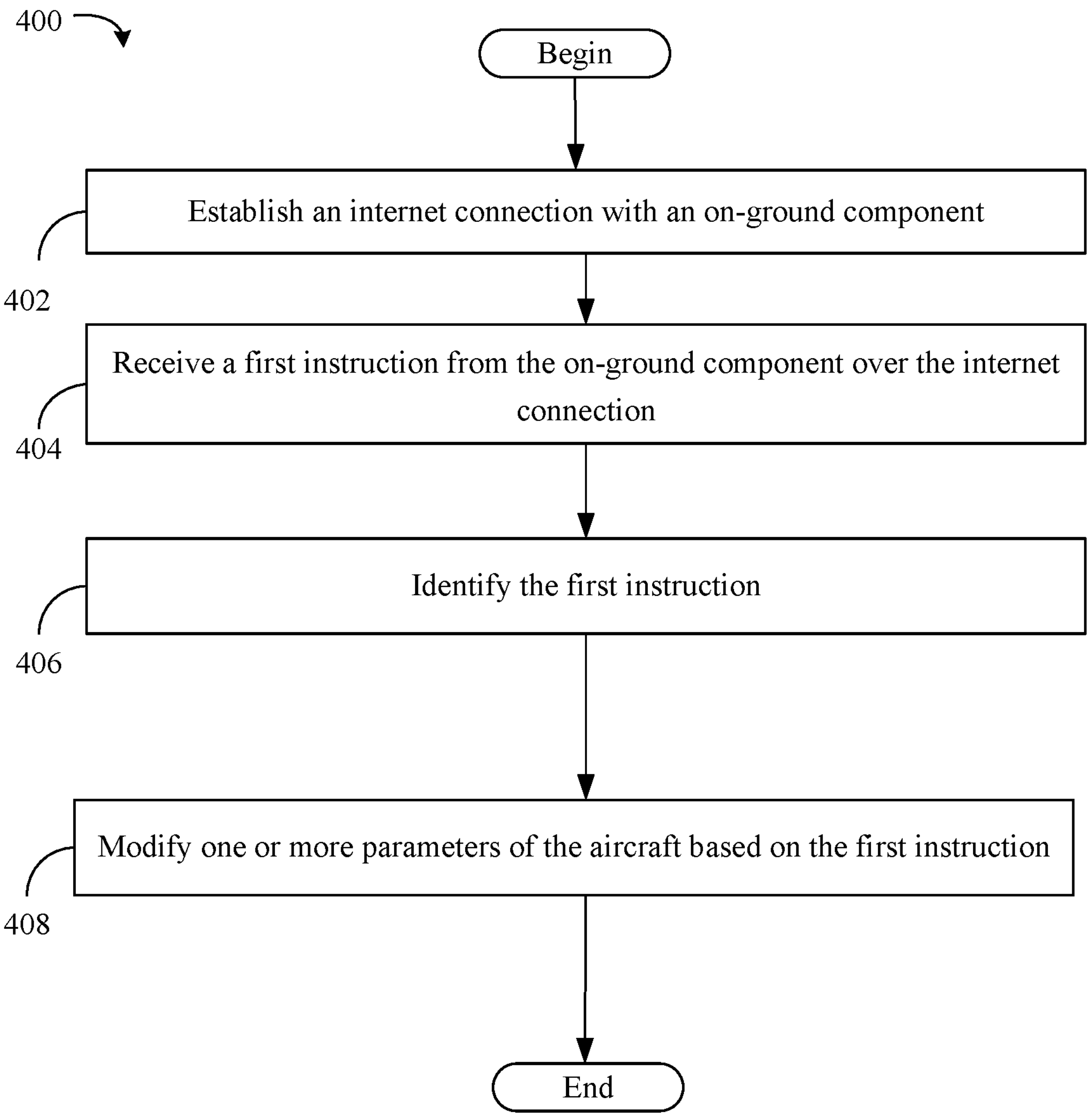
FIG. 4 is a flowchart of an example of a method of internet-based communication between an aircraft and a ground component according to an example.

FIG. 4 shows a method 400 of internet-based communication between a ground component and an aircraft. The method 400 is generally implemented in an aircraft such as, for example, the aircraft 108 (FIG. 1), aircraft 210 (FIG. 2) and/or aircraft 310 already discussed. In an example, the method 400 is implemented in one or more modules as a set of logic instructions stored in a non-transitory machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

Illustrated processing block 402 establishes an internet connection with an on-ground component. Illustrated processing block 404 receives a first instruction from the on-ground component over the internet connection. Illustrated processing block 406 identifies the first instruction. Illustrated processing block 408 modifies one or more parameters of the aircraft based on the first instruction. In examples, the method 400 further includes determining that the first instruction is a crated uplink command associated with a destination system of the aircraft, uncrating the crated uplink command to generate an uncrated uplink command, and relaying the uncrated uplink command to the destination system for execution by the destination system.

In examples, the method 400 further includes determining that the first instruction is associated with an initiation of a streaming process, and initiating the streaming process with the on-ground component. Further, the method 400 further includes determine that the first instruction is associated with a sub-system of the aircraft, streaming data from the sub-system to the on-ground component, establishing a dedicated internet connection to the on-ground component for streaming, and bypassing a file transfer system to stream the data from the sub-system to the on-ground component over the dedicated internet connection. For example, the aircraft continuously streams the data for a predetermined period of time. In examples, the method 400 further includes receiving a second instruction from the on-ground component over the internet connection, determining that the second instruction is associated with a cessation of the streaming process, and ceasing the streaming process in response to the second instruction being determined to be associated with the cessation. In examples, the method 400 further includes identifying from the first instruction, a sub-system of the aircraft, identifying data from the sub-system that is to be streamed during the streaming process, encrypting the data prior to the data being streamed, and streaming the encrypted data in an uncrated format.

Figure 5:
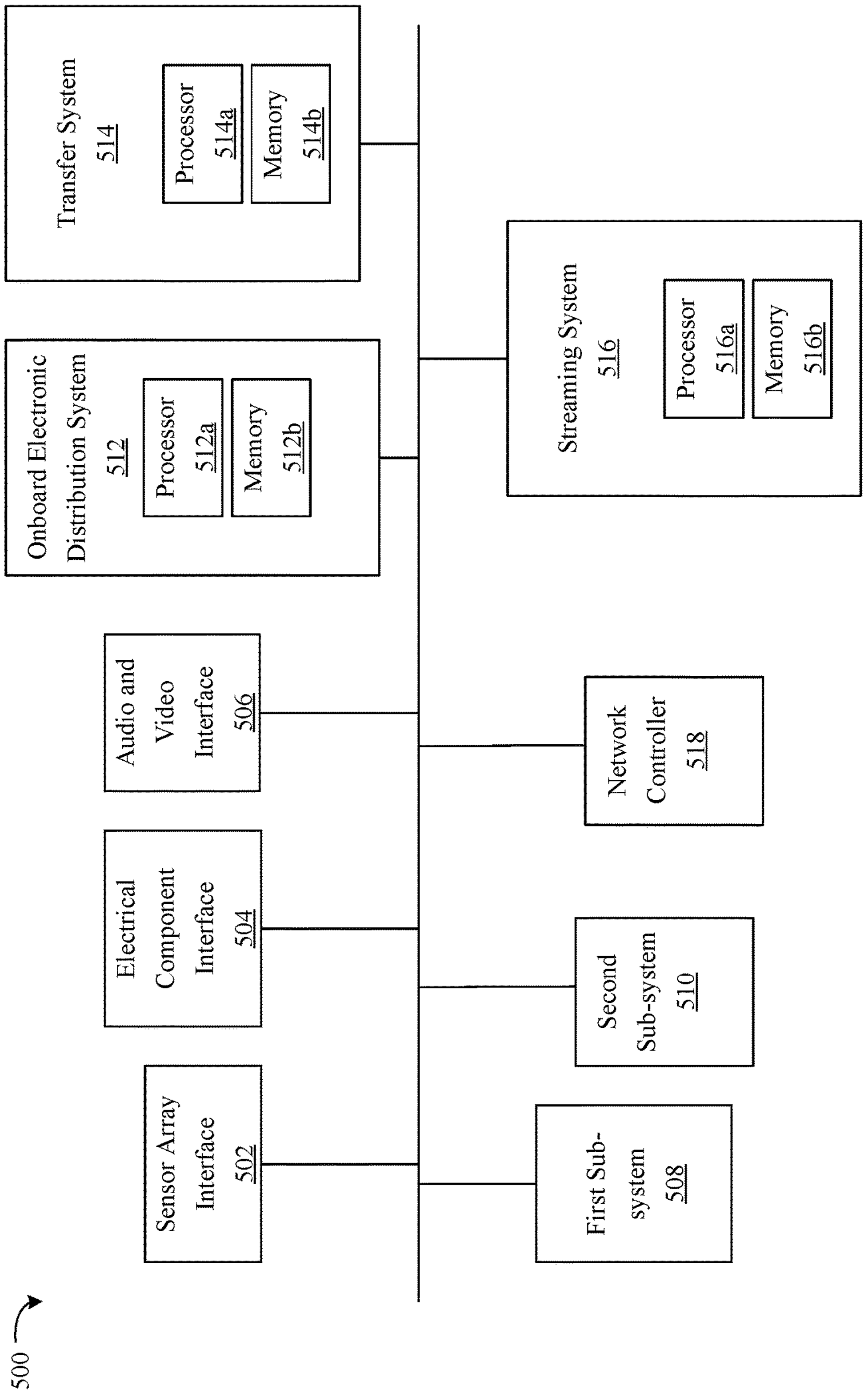
FIG. 5 is a block diagram of an example of an aircraft according to an example.

FIG. 5 shows a more detailed example of an aircraft 500 to that enables internet communications. The aircraft 500 implements aspects of any of the examples herein, and is readily substituted for the aircraft 108 (FIG. 1), aircraft 210 (FIG. 2), aircraft 310 and method 400 already discussed. already discussed.

The aircraft 500 includes a sensor array interface 502 that retrieves sensor data for the aircraft 500. The sensor array interface 502 interacts with various sensors of the aircraft 500 to identify measurements of various conditions (e.g., humidity, altitude, velocity, acceleration, trajectory, etc.). The aircraft 500 includes an electrical component interface 504 that controls electrical sensors of the airplane to modify parameters of the aircraft 500 and/or provide updates of the electrical components (e.g., operating conditions). The aircraft 500 includes an audio and video interface 506 that retrieves audio and visual data from the aircraft 500.

The aircraft 500 further includes network controller 518. The network controller 518 establishes an internet connection with a ground component for communications. The aircraft 500 further includes a first sub-system 508 and a second sub-system 510. As discussed, the ground component sends a first instruction over the internet connection that commands the aircraft 500 to modify one or more parameters of the aircraft 500, such as parameters of the first and second sub-systems 508, 510.

The aircraft 500 includes an OEDS 512, transfer system 514 and streaming system 516. The OEDS 512 receives data from the network controller 518 and determine that the first instruction is a crated uplink command associated with a destination system of the aircraft, uncrate the crated uplink command to generate an uncrated uplink command, and relay the uncrated uplink command to the destination system for execution by the destination system.

In examples, the OEDS 512 determines that the first instruction is associated with an initiation of a streaming process, and initiate the streaming process with the on-ground component. The OEDS 512 further determines that the first instruction is associated with one or more of the first or second sub-systems 508, 510 of the aircraft 500. The OEDS 512 requests that the transfer system 514 transfer the first instruction to the one or more of the first or second sub-systems 508, 510. The one or more of the first or second sub-systems 508, 510 then streams data to the on-ground component.

For example, the network controller 518 establishes a dedicated internet connection to the on-ground component for streaming, and the one or more of the first or second sub-systems 508, 510 bypasses the transfer system 516 to stream the data to the on-ground component over the dedicated internet connection. Rather, the one or more of the first or second sub-systems 508, 510 streams data through the streaming system 516 to bypass the transfer system 516. The one or more of the first or second sub-systems 508, 510 continuously streams the data for a predetermined period of time. In examples, the OEDS 512 encrypts the data prior to the data being streamed over the network controller 518 to the ground component, and the network controller 518 streams the encrypted data to the ground component in an uncrated format.

In examples, the network controller 518 receives a second instruction from the on-ground component over the internet connection. The OEDS 512 determines that the second instruction is associated with a cessation of the streaming process, sends a resultType of "delivered" (e.g., as a notification) to the on-ground component (e.g., a server) when the second instruction is delivered, and ceases the streaming process in response to the second instruction being determined to be associated with the cessation.

Additionally, the OEDS 512 includes a processor 512*a* (e.g., embedded controller, central processing unit/CPU) and a memory 512*b* (e.g., non-volatile memory/NVM and/or volatile memory) containing a set of instructions, which when executed by the processor 512*a*, implements any of the aspects as described herein. Additionally, the transfer system 514 includes a processor 514*a* (e.g., embedded controller, central processing unit/CPU) and a memory 514*b* (e.g., non-volatile memory/NVM and/or volatile memory) containing a set of instructions, which when executed by the processor 514*a*, implements any of the aspects as described herein. Further, the streaming system 516 includes a processor 516*a* (e.g., embedded controller, central processing unit/CPU) and a memory 516*b* (e.g., non-volatile memory/NVM and/or volatile memory) containing a set of instructions, which when executed by the processor 516*a*, implements any of the aspects as described herein. In examples, the OEDS 512, transfer system 514 and streaming system 516 all execute with a same processor and memory.

Thus, technology described herein supports an enhanced method of communication between an aircraft and ground stations. Doing so reduces latency in communications, and permit new functions (e.g., streaming data from the aircraft) that previously were not able to be implemented.

Examples are applicable for use with all types of semiconductor integrated circuit ("IC") chips. Examples of these IC chips include but are not limited to processors, controllers, chipset components, programmable logic arrays (PLAs), memory chips, network chips, systems on chip (SOCs), SSD/NAND controller ASICs, and the like. In addition, in some of the drawings, signal conductor lines are represented with lines. Some can be different, to indicate more constituent signal paths, have a number label, to indicate a number of constituent signal paths, and/or have arrows at one or more ends, to indicate primary information flow direction. This, however, should not be construed in a limiting manner. Rather, such added detail can be used in connection with one or more exemplary examples to facilitate easier understanding of a circuit. Any represented signal lines, whether or not having additional information, can actually comprise one or more signals that can travel in multiple directions and can be implemented with any suitable type of signal scheme, e.g., digital or analog lines implemented with differential pairs, optical fiber lines, and/or single-ended lines.

Example sizes/models/values/ranges can have been given, although examples are not limited to the same. As manufacturing techniques (e.g., photolithography) mature over time, it is expected that devices of smaller size could be manufactured. In addition, well known power/ground connections to IC chips and other components can or cannot be shown within the figures, for simplicity of illustration and discussion, and so as not to obscure certain aspects of the examples. Further, arrangements can be shown in block diagram form in order to avoid obscuring examples, and also in view of the fact that specifics with respect to implementation of such block diagram arrangements are highly dependent upon the computing system within which the example is to be implemented, i.e., such specifics should be well within purview of one skilled in the art. Where specific details (e.g., circuits) are set forth in order to describe example examples, it should be apparent to one skilled in the art that examples can be practiced without, or with variation of, these specific details. The description is thus to be regarded as illustrative instead of limiting.

The term "coupled" can be used herein to refer to any type of relationship, direct or indirect, between the components in question, and can apply to electrical, mechanical, fluid, optical, electromagnetic, electromechanical or other connections. In addition, the terms "first", "second", etc. can be used herein only to facilitate discussion, and carry no particular temporal or chronological significance unless otherwise indicated.

As used in this application and in the claims, a list of items joined by the term "one or more of" can mean any combination of the listed terms. For example, the phrases "one or more of A, B or C" can mean A; B; C; A and B; A and C; B and C; or A, B and C.

Those skilled in the art will appreciate from the foregoing description that the broad techniques of the examples can be implemented in a variety of forms. Therefore, while the examples have been described in connection with particular examples thereof, the true scope of the examples should not be so limited since other modifications will become apparent to the skilled practitioner upon a study of the drawings, specification, and following claims.

I claim:

1. A computing system associated with an aircraft, the computing system comprising:

a network controller that establishes an internet connection with an on-ground component, wherein the network controller receives a first instruction from the on-ground component over the internet connection;

at least one processor coupled to the network controller; and at least one memory coupled to the at least one processor, the at least one memory including a set of instructions, which when executed by the at least one processor, causes the computing system to:

determine a streaming command based on the first instruction;

determine, by a file transfer system, that the streaming command is associated with a sub-system of the aircraft;

transfer, by the file transfer system, the streaming command to the sub-system;

modify one or more parameters of the aircraft based on the streaming command;

determine, by the sub-system, that the streaming command is associated with an initiation of a streaming process from the sub-system;

request, with the sub-system, that the file transfer system create a streaming service to stream data associated with the streaming process;

generate, with the file transfer system, the streaming service;

generate, with an online electronic distribution system, a dedicated connection to stream the data from the online electronic distribution system to the on-ground component;

transfer the data over the streaming service to the online electronic distribution system by bypassing transfer of the data over the file transfer system; and stream, by the online electronic distribution system, the data over the dedicated connection.

2. The system of claim 1, wherein the instructions, when executed, cause the computing system to:

determine that a second instruction, received from the on-ground component, is a crated uplink command associated with a custom command;

uncrate the crated uplink command to generate an uncrated uplink command;

relay the uncrated uplink command to a destination system for execution by the destination system;

provide a first notification to the on-ground component that the first second instruction is received; and provide a second notification to the on-ground component that the first second instruction is executed.

3. The system of claim 1, wherein the instructions, when executed, cause the computing system to:

determine that the first instruction is a first crated downlink command;

uncrate the first crated downlink command to generate the streaming command; and provide a notification to the on-ground component that the first instruction is received.

4. The system of claim 3, wherein the network controller receives a second instruction from the on-ground component over the internet connection;

wherein the instructions, when executed, cause the computing system to:

determine that the second instruction is a second crated downlink command associated with a cessation of the streaming process;

uncrate the second crated downlink command to generate an uncrated downlink command;

relay the uncrated downlink command to the sub-system for execution by the sub-system;

provide a notification to the on-ground component that the second instruction is received; and cease the streaming process in response to the second instruction being determined to be associated with the cessation, wherein the dedicated connection is a dedicated internet connection.

5. The system of claim 3, wherein the instructions, when executed, cause the computing system to:

encrypt the data prior to the data being streamed; and stream the encrypted data in an uncrated format.

6. The system of claim 1, wherein the instructions, when executed, cause the computing system to:

continuously stream the data for a predetermined period of time.

7. The system of claim 1, wherein the data includes one or more of location, altitude, conditions of electronic equipment, temperature, cabin pressure, occupancy, video feeds, equipment measurements or audio feeds.

8. At least one non-transitory computer readable storage medium comprising a set of instructions, which when executed by a computing device associated with an aircraft, causes the computing device to:

establish an internet connection with an on-ground component;

receive a first instruction from the on-ground component over the internet connection;

determine a streaming command based on the first instruction;

determine, by a file transfer system, that the streaming command is associated with a sub-system of the aircraft;

transfer, by the file transfer system, the streaming command to the sub-system;

modify one or more parameters of the aircraft based on the streaming command;

determine, by the sub-system, that the streaming command is associated with an initiation of a streaming process from the sub-system;

request, with the sub-system, that the file transfer system create a streaming service to stream data associated with the streaming process;

generate, with the file transfer system, the streaming service;

generate, with an online electronic distribution system, a dedicated connection to stream the data from the online electronic distribution system to the on-ground component;

transfer the data over the streaming service to the online electronic distribution system by bypassing transfer of the data over the file transfer system; and stream, by the online electronic distribution system, the data over the dedicated connection.

9. The at least one non-transitory computer readable storage medium of claim 8, wherein the instructions, when executed, cause the computing device to:

determine that a second instruction, received from the on-ground component, is a crated uplink command associated with a custom command;

uncrate the crated uplink command to generate an uncrated uplink command;

relay the uncrated uplink command to a destination system for execution by the destination system;

provide a first notification to the on-ground component that the first second instruction is received; and provide a second notification to the on-ground component that the first second instruction is executed.

10. The at least one non-transitory computer readable storage medium of claim 8, wherein the instructions, when executed, cause the computing device to:

determine that the first instruction is a first crated downlink command;

uncrate the first crated downlink command to generate the streaming command; and provide a notification to the on-ground component that the first instruction is received.

11. The at least one non-transitory computer readable storage medium of claim 10, wherein the instructions, when executed, cause the computing device to:

receive a second instruction from the on-ground component over the internet connection;

determine that the second instruction is a second crated downlink command associated with a cessation of the streaming process;

uncrate the second crated downlink command to generate an uncrated downlink command;

relay the uncrated downlink command to the sub-system for execution by the sub-system;

provide a notification to the on-ground component that the second instruction is received; and cease the streaming process in response to the second instruction being determined to be associated with the cessation, wherein the dedicated connection is a dedicated internet connection.

12. The at least one non-transitory computer readable storage medium of claim 10, wherein the instructions, when executed, cause the computing device to:

encrypt the data prior to the data being streamed; and stream the encrypted data in an uncrated format.

13. The at least one non-transitory computer readable storage medium of claim 8, wherein the instructions, when executed, cause the computing device to:

continuously stream the data for a predetermined period of time.

14. The at least one non-transitory computer readable storage medium of claim 8, wherein the data includes one or more of location, altitude, conditions of electronic equipment, temperature, cabin pressure, occupancy, video feeds, equipment measurements or audio feeds.

15. A method associated with an aircraft, the method comprising:

establishing an internet connection with an on-ground component;

receiving a first instruction from the on-ground component over the internet connection;

determining a streaming command based on the first instruction;

determining, by a file transfer system, that the streaming command is associated with a sub-system of the aircraft;

transferring, by the file transfer system, the streaming command to the sub-system;

modifying one or more parameters of the aircraft based on the streaming command;

determining, by the sub-system, that the streaming command is associated with an initiation of a streaming process from the sub-system;

requesting, with the sub-system, that the file transfer system create a streaming service to stream data associated with the streaming process;

generating, with the file transfer system, the streaming service;

generating, with an online electronic distribution system, a dedicated connection to stream the data from the online electronic distribution system to the on-ground component;

transferring the data over the streaming service to the online electronic distribution system by bypassing transfer of the data over the file transfer system; and streaming, by the online electronic distribution system, the data over the dedicated connection.

16. The method of claim 15, further including:

determining that a second instruction, received from the on-ground component, is a crated uplink command associated with a custom command;

uncrating the crated uplink command to generate an uncrated uplink command;

relaying the uncrated uplink command to a destination system for execution by the destination system;

providing a first notification to the on-ground component that second first instruction is received; and providing a second notification to the on-ground component that second first instruction is executed.

17. The method of claim 15, further including:

determining that the first instruction is a first crated downlink command;

uncrating the first crated downlink command to generate the streaming command; and providing a notification to the on-ground component that the first instruction is received.

18. The method of claim 17, further including:

receiving a second instruction from the on-ground component over the internet connection;

determining that the second instruction is a second crated downlink command associated with a cessation of the streaming process;

uncrating the second crated downlink command to generate an uncrated downlink command;

relaying the uncrated downlink command to the sub-system for execution by the sub-system;

providing a notification to the on-ground component that the second instruction is received; and ceasing the streaming process in response to the second instruction being determined to be associated with the cessation, wherein the dedicated connection is a dedicated internet connection.

19. The method of claim 17, further including:

encrypting the data prior to the data being streamed; and streaming the encrypted data in an uncrated format.

20. The method of claim 15, further including:

continuously streaming the data for a predetermined period of time.

* * * * *